United States Patent [19]

Silveri

[11] Patent Number: 5,240,228

[45] Date of Patent: Aug. 31, 1993

[54] SPOOLING REEL FOR ELECTROLYTIC POOL PURIFIER

[76] Inventor: Michael A. Silveri, 483 Skylake Ct., Incline Village, Nev. 89451

[21] Appl. No.: 786,304

[22] Filed: Nov. 1, 1991

Related U.S. Application Data

[63] Continuation-in-part of Ser. No. 770,074, Oct. 1, 1991, which is a continuation-in-part of Ser. No. 759,692, Sep. 6, 1991, which is a continuation of Ser. No. 680,591, Mar. 28, 1991, abandoned, which is a continuation of Ser. No. 597,085, Oct. 15, 1990, abandoned.

[51] Int. Cl.$^5$ .............................................. E21C 29/16
[52] U.S. Cl. ................................................ 254/134.4
[58] Field of Search ...................... 254/134.4, 134.3 R, 254/134.3 FT; 226/97; 15/104.06

[56] References Cited

U.S. PATENT DOCUMENTS

| | | | |
|---|---|---|---|
| 1,851,435 | 3/1932 | Jessup ................................ | 254/134.4 |
| 3,283,123 | 11/1966 | Atkinson et al. ................. | 254/134.4 |
| 4,726,564 | 2/1988 | Lynn .................................. | 254/134.4 |
| 4,992,156 | 2/1991 | Silveri . | |
| 4,997,540 | 3/1991 | Howlett . | |
| 5,034,110 | 7/1991 | Glore et al. . | |

FOREIGN PATENT DOCUMENTS

WO8601543  3/1986  PCT Int'l Appl. .

Primary Examiner—Robert C. Watson
Attorney, Agent, or Firm—Knobbe, Martens, Olson & Bear

[57] ABSTRACT

A reel for installing electrical wiring through the water circulation line of a swimming pool comprising a central housing and a tubular junction fitted to the housing. A spool of line is contained within a watertight chamber defined by the central housing. The other end of the tubular junction is fitted to a hole drilled in the water circulation line of a pool, and water from the circulation line is allowed to fill the chamber of the reel. The spool floats freely within the chamber as line unwinds from it and passes through the tubular junction to the water circulation line and out into the pool. Electrical wiring is then fastened to the end of the line and pulled back through the water circulation line.

19 Claims, 8 Drawing Sheets

SPOOLING REEL FOR ELECTROLYTIC POOL PURIFIER

RELATED APPLICATIONS

This application is a continuation-in-part of a co-pending application, Ser. No. 770,074 filed Oct. 1, 1991, which is a continuation-in-part of a co-pending application, Ser. No. 259,692, filed Sep. 6, 1991, which is a continuation of an application, Ser. No. 680,591, filed Mar. 28, 1991, now abandoned which is a continuation of an application, Ser. No. 597,085, filed Oct. 15, 1990 now abandoned.

BACKGROUND OF THE INVENTION

1. Field of the Invention

The present invention relates to a water purifier, more particularly to a submerged electrolytic cell, and to an apparatus and method for installing such a submerged electrolytic cell.

2. Description of Related Art

Sodium hypochlorite is commonly used as a sanitizing agent in swimming pools and the like to control bacterial growth. Typical pool maintenance requires adding liquid sodium hypochlorite to pool water. Some pool owners, however, use electrolytic cell devices in their pools or in their filtration systems to produce sodium hypochlorite by electrolysis. Examples of electrolytic cells used to generate sanitizing agents are disclosed in U.S. Pat. Nos. 4,992,156 and 4,790,923.

The electrolytic cell is connected to the power supply for the pool equipment via wires which are threaded through the return line. In practice, it is difficult to install this wiring. Bends and irregularities in the pipe present a problem during installation, as does the length of some water circulation lines through which electrical wiring must be threaded in order to install it.

SUMMARY OF THE INVENTION

In accordance with one aspect of the present invention, an apparatus is provided for the installation of wiring through a water circulation line of a swimming pool. The apparatus comprises a reel with a central housing which defines a chamber, said central housing comprising a body and a cap removably connected to said body to form a watertight union. This chamber communicates with the water circulation line of the pool through a tubular junction. Water enters the chamber from the water circulation line through the tubular junction. When said cap is closed so as to render said chamber watertight, the water in the chamber will be subject to approximately the same pressure as water in the circulation line. A spool inside the chamber may then release line into the water circulation line without fighting the counteracting force of back pressure. After the line has reached the pool, the wires are attached to it and the line is used to drag the wires through the water line.

In a preferred embodiment, the present invention comprises a tubular central housing which is fitted onto a clear plastic tube. This tube extends outwardly from one end of the housing so that the operation of the spool and line may be viewed. Over the outer opening of this tube is placed a cap. The central housing, tube, and cap together form the chamber of the reel.

In this embodiment, a plug is fitted to the other side of the central housing. The plug is secured to the central housing with a retainer ring. The retainer ring is removably secured to the central housing. In a preferred embodiment, the retainer ring is provided with grooves which screw onto threads on the central housing. In this way, the interior of the central housing is easily accessed by the operator of the reel. A rubber seal may be placed on the surface of the plug which contacts the central housing so that a watertight seal is formed between the central housing and the plug and so that pressure is maintained inside the chamber.

Another preferred embodiment comprises a tubular junction which engages the central housing such that the opening of the junction communicates with the interior of the central housing. The junction may be fitted at the opposite end to a pipe which is part of the water circulation line of a pool such that the opening of the junction communicates with the interior of the water circulation line. Threads at this end of the tubular junction may be screwed into corresponding grooves in the pipe of the water circulation line to secure the junction to the pipe.

In a further embodiment of the present invention, a leader may be attached to the end of the line which is wound around the spool to facilitate its movement through the water circulation line. Preferably, such a leader is approximately ¼ inch long and is made from a piece of closed cell neoprene. It may also, however, be made from cellophane, small corks, rubber stoppers, polyethylene balls, or even wire nuts.

Another embodiment of the present invention comprises a floating spool which is contained inside the central housing. When the chamber is filled with water from the water circulation line, the spool floats inside the chamber and releases line through the junction and into the water circulation line by unwinding. Since the spool does not engage a spindle or other member for support, it is subject to only very minimal mechanical friction.

The above-described apparatus is particularly useful for installing a water purifier which mounts at the outlet end of the water return line. In the preferred embodiment, the water purifier comprises a nozzle body having an elongated tubular shape which defines an interior cavity to receive water from a water circulation line of a pool. The nozzle body includes an edge defining an aperture. At least a portion of the edge angles outwardly in the radial direction, giving the aperture an area increasing from an inner surface of the body to an outer surface of the body. The nozzle additionally comprises a nozzle connector configured to couple the nozzle body to the water circulation line.

In a preferred embodiment, the nozzle connector comprises a tubular body having a threaded outer surface engaging the water circulation line. The nozzle body defines a plurality of apertures, each aperture having a minimum area sized to produce a sufficient flow rate of water through the apertures to break off scale formations projecting from the aperture edges. The minimum area of the apertures preferably ranges between about 1/16th inch and about ⅛th inch, and may equal approximately 3/16th inch. The edges of the apertures angle outwardly from a radius of the tubular nozzle body by an incline angle equal to about 30° to 60°, and may equal approximately 45°.

In accordance with another aspect of the present invention, the water sanitizing apparatus mounts in a pool having a water circulation line. The sanitizing apparatus comprises an electrolytic cell having a plurality of electrodes and an enclosure having an internal cavity which houses the electrolytic cell. The sanitizing apparatus further includes a nozzle which in a preferred embodiment comprises a nipple. The nipple has an elongated tubular shape which defines an internal flow passage to receive water from the circulation line. The nipple includes an edge defining an aperture, at least a portion of the edge angles outwardly in the radial direction to define an aperture which increases in area from an inner surface of the nipple to an outer surface of the nipple. In assembly, the nipple aperture is positioned within the internal cavity of the enclosure.

In a preferred embodiment, the nipple defines a plurality of apertures equally spaced around the circumference of the nipple, and may define four rectangular apertures. With the electrodes juxtaposed in the interior cavity, the length of the rectangular apertures is greater than a distance across the juxtaposed series of electrodes. The apertures have a minimum area sized to produce a sufficient flow rate of water through the apertures to break off scale formations projecting from the nipple edges. The nipple is preferably constructed of a high molecular weight polyethylene.

The enclosure preferably defines an aperture and the electrolytic cell includes a bore passing through the electrodes which aligns with the enclosure aperture in assembly. The enclosure aperture and the bore receive a cap end of the nipple. The apparatus additionally comprises a cap removably engaging the nipple cap end to seal the nipple cap end and secure the enclosure onto the nipple.

The enclosure further comprises an outlet opening allowing water to flow through the enclosure interior cavity and into the pool. The opening is defined between chamfer edges extending outwardly from the center of the enclosure. The chamfer edges are sufficiently close together to produce an ample flow rate of water through the outlet to break off scale formations projecting from the chamfer edges.

In accordance with a further aspect of the present invention, a water sanitizing apparatus for mounting in a pool having a water circulation line comprises an enclosure having an internal cavity and an outlet opening; chamfer edges define the opening. The apparatus further comprises a tubular nipple communicating with the water circulation line and defining an aperture. The nipple extends partially into the interior cavity to position the aperture therein. Water flows through the nipple, into the internal cavity, out of the outlet opening and into the pool.

In a preferred embodiment, the chamfer edges are sufficiently close together to produce an ample flow rate of water through the outlet to break off scale formations projecting from the chamfer edges.

In accordance with another aspect of the present invention, there is provided a method of installing a water sanitizing apparatus in a pool having a water circulation line, whereby an electrical wire is connected to the sanitizing apparatus and the wire is threaded through a portion of the water circulation line. An elongated nipple is coupled with an outlet fitting of the water circulation line and extends outwardly from the pool wall. The enclosure is positioned beneath the surface of the pool and in front of the water circulation line. The enclosure is subsequently slid over the nozzle to a position proximate to the pool wall. A cap secures the enclosure onto the nozzle, between the pool wall and the cap, by engaging the extended nozzle end.

DETAILED DESCRIPTION OF THE PREFERRED EMBODIMENT

Figure 1:
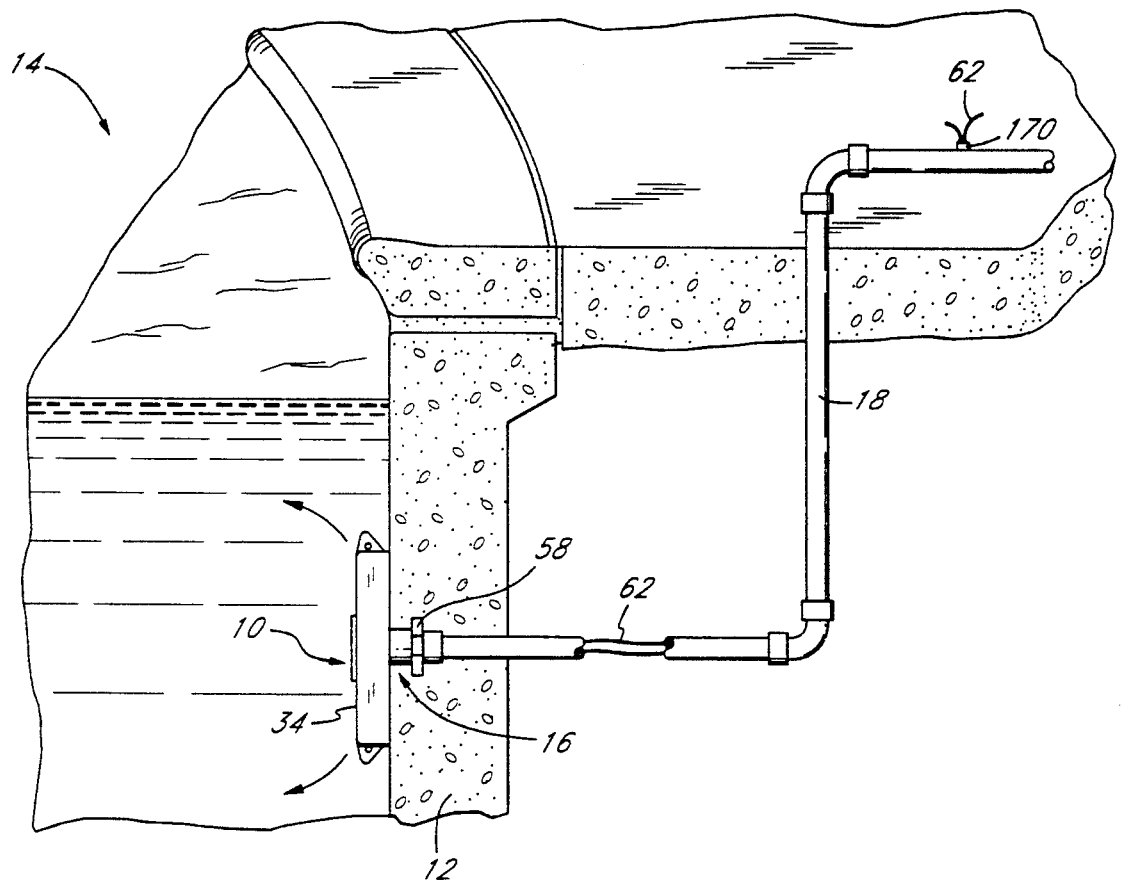
FIG. 1 illustrates a water purifier in accordance with one embodiment of the present invention attached to a side wall of a swimming pool.

FIG. 1 illustrates a sanitizing apparatus or purifier 10 of the present invention secured to a wall 12 of a swimming pool 14. Although the discussion of the purifier 10 proceeds in connection with a swimming pool, it is understood that the purifier 10 can also work with spas (i.e., Jacuzzies ®), water fountains and the like.

Figure 2:
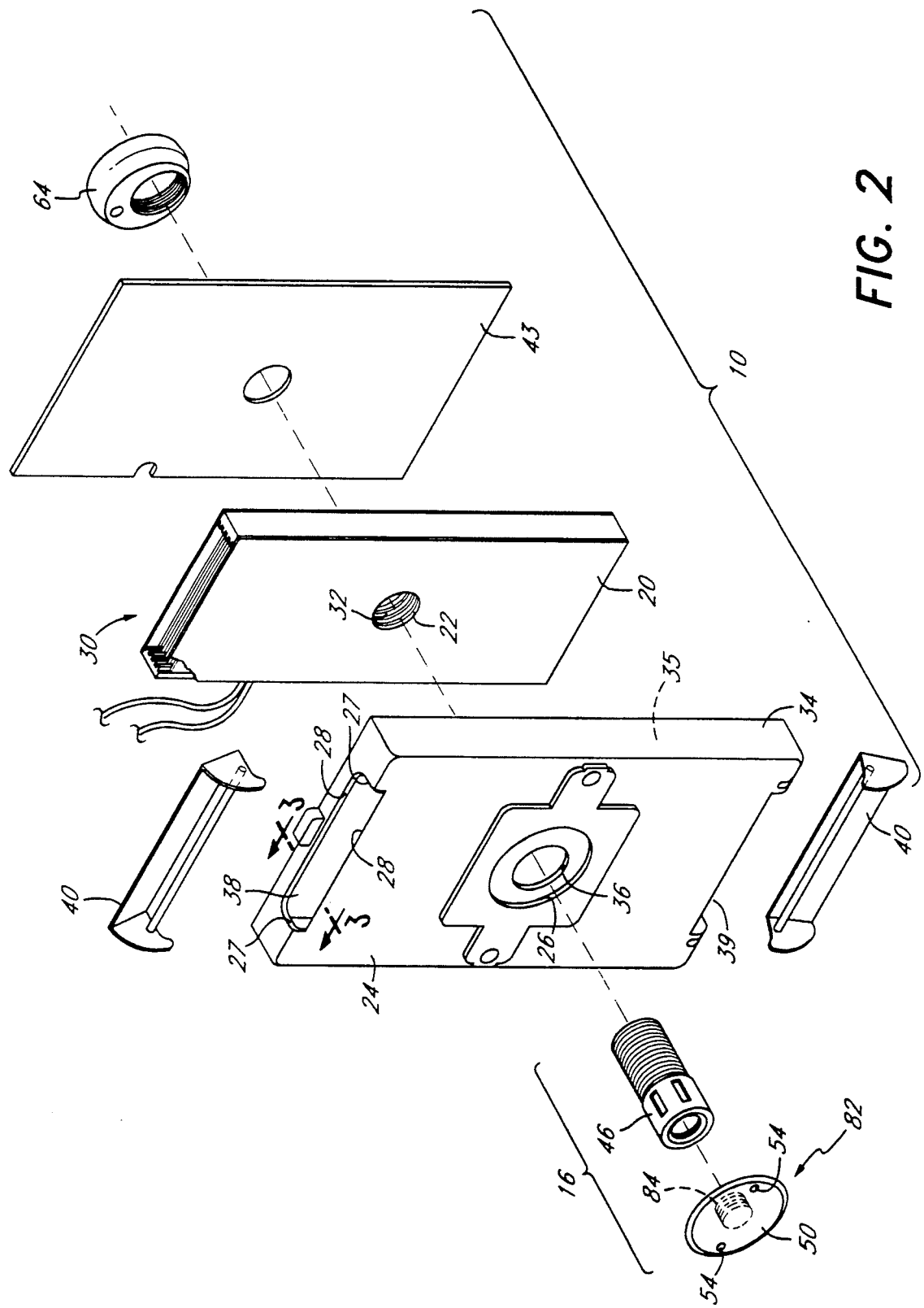
FIG. 2 is an exploded perspective view of the purifier of FIG. 1.

Referring to FIGS. 1 and 2, the purifier 10 comprises an electrolytic cell 30 housed in an enclosure 34 and an attaching apparatus 16 for securing the electrolytic cell 30 to the pool wall 12. The attaching apparatus 16 is located at an exit port of a water circulation line 18. As a result, pressurized water exiting the water circulation line 18 flows through the enclosure 34, passing over the electrolytic cell 30. As discussed in detail below, the resulting water stream aids in reducing scale build-up on the electrolytic cell 30, the enclosure 34 and the attaching apparatus 16.

As illustrated in FIG. 2, the electrolytic cell 30 is generally configured in accordance with the teachings of U.S. Pat. No. 4,992,156, issued on Feb. 12, 1991, which is hereby incorporated by reference. The electrolytic cell 30 comprises a plurality of juxtaposed electrode plates 20. Each electrode plate 20 has a rectangular shape and defines an aperture 22 at its center. As juxtaposed, the electrode plates 20 define a cylindrical bore 32 having an axis perpendicular to the electrode plates 20.

The enclosure 34 fully encompasses the electrolytic cell 30 within an internal cavity 35. The enclosure 34 is molded of a thermoplastic, and defines an aperture 36 extending through the enclosure 34; the aperture 36 aligns with the bore 32 of the electrolytic cell in assembly. As a result, a portion of the attaching apparatus 16 (namely a nipple 46) passes partially through the enclosure 34 and the electrolytic cell 30 in assembly. A front panel 24 of the enclosure includes a recess 26 having a larger diameter than the aperture 36 and circumscribing the aperture 36.

The enclosure 34 additionally comprises a top opening 38 and a bottom opening 39, providing exit ports for water flowing through the enclosure 34 from the water circulation line 18. The openings 38, 39 also provide a flow path for water circulating through the enclosure 34 as a result of the electrolytic process. With a circulation pump off, the electrolysis generates gaseous bubbles which travel through the enclosure 34 towards the surface of the pool water. The natural movement of the bubbles produces a current flow of water through the enclosure 34, entering through the bottom opening 39 and exiting through the top opening 38.

Figure 3:
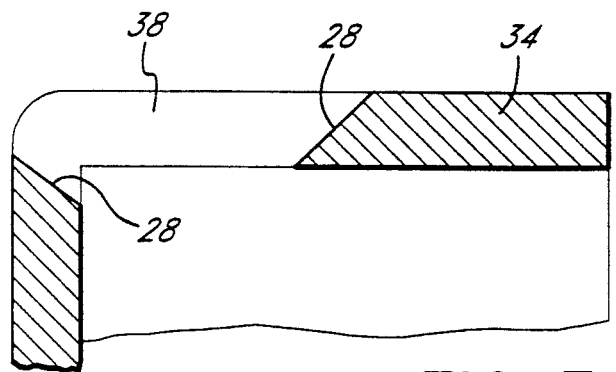
FIG. 3 is a partial cross-sectional view taken along line 3—3 of FIG. 2.

As illustrated in FIG. 2, the top opening 38 has generally a rectangular configuration defined by four edge surfaces 27, 28. Two of the edge surfaces 28, as best seen in FIG. 3, comprise chamfers, angling away from the defined opening 38. The opening 38 increase in area in an outward direction as a result of the chamfer configuration of the edge surfaces 28. As used herein, the "area" of an opening aperture, or orifice is measured across a plane of the opening, aperture or orifice perpendicular to the water flow. The bottom opening 39 has an identical configuration. This configuration increases water flow rate through the openings 38, 39; water flowing through the openings 38, 39 remains in a concentrated stream and does not diffuse at the outer edges of the openings 38, 39. As a result, the flow rate through the openings 38, 39 increases as water passes through the openings 38, 39.

The increased flow rate reduces scale formations which clog the openings 38, 39. Scale, in hard water, deposits on the edges 27, 28 of the openings 38, 39 and builds outwardly in a stalagmite fashion, away from the edge surfaces 27, 28. The increased flow, however, limits the growth of the scale deposit. The increased water current fractures the stalagmite structure extending into the center of the current. Thus, scale is less likely to bridge the openings 38, 39 and to reduce the flow of water through the purifier 10.

About each opening 38, 39, the enclosure includes a directional diffuser 40. The directional diffusers direct water flow exiting the openings 38, 39 towards the center of the pool 14. As illustrated in FIG. 2, each diffusers preferable includes a metal rod 41 extending longitudinally across the diffuser. The rods act as a grate or guard, preventing objects smaller than the openings 38, 39 from entering the openings.

Figure 4:
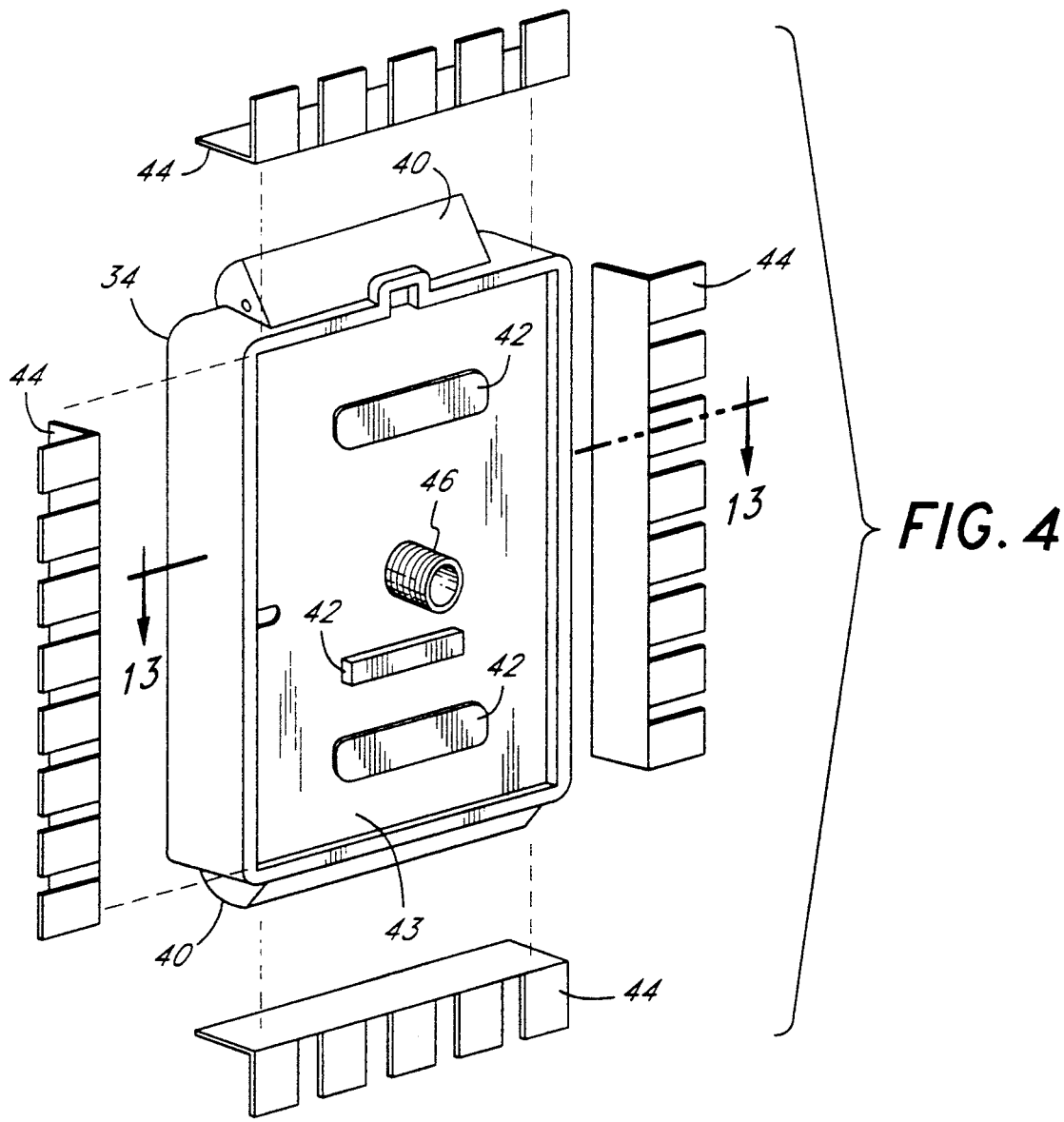
FIG. 4 is a partial rear perspective view of the purifier of FIG. 1, illustrated with wall spacers.
Figure 5:
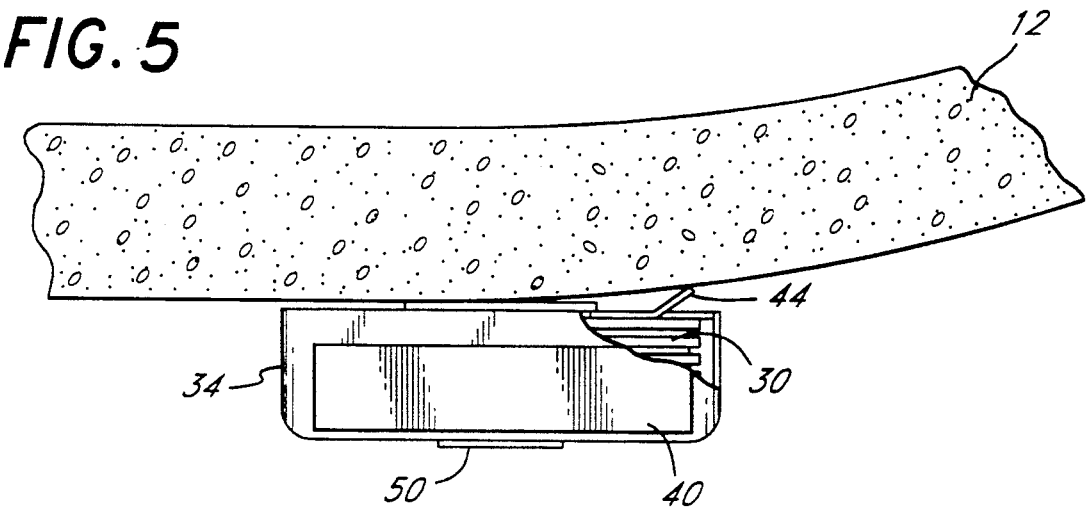
FIG. 5 is a plan view of the purifier of FIG. 1 mounted to a curved pool wall.

Referring to FIG. 4, the enclosure 34 also includes two flange brackets 42 integrally mounted onto a back panel 43 of the enclosure 34. These brackets 42 receive several spacers 44 which wedge between the enclosure 34 and the pool wall 12 to blend with the contoured (or otherwise not flat) surface of the pool wall 12, as illustrated in FIG. 5. Although FIGS. 4 and 5 illustrate the purifier 10 as having four rectangular spacers 44, the proper combination and shape of the spacers 44 is dictated by the shape and contour of the pool wall 12.

Figure 6:
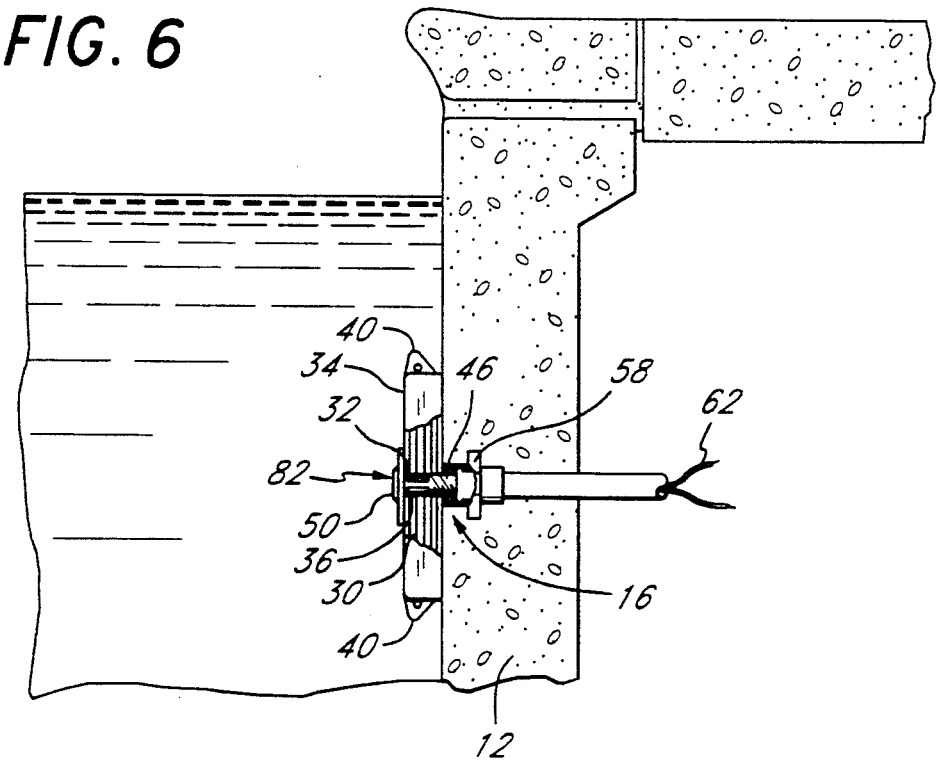
FIG. 6 is a partial cross-sectional view of the purifier of FIG. 1 attached to an existing pool fitting embedded in the pool wall.

Referring to FIG. 6, the attaching apparatus 16 secures the enclosures 34 to the pool wall 12. The attaching apparatus advantageously utilizes an existing fitting 58 of the water circulation line 18 located on the pool wall 12. Pools commonly include at least one exit port fitting 58 positioned in the pool wall 12 below the water line and in communication with the water circulating system. Employing the existing fitting 58 reduces the cost and time associated with installation of the purifier 10.

Figure 7:
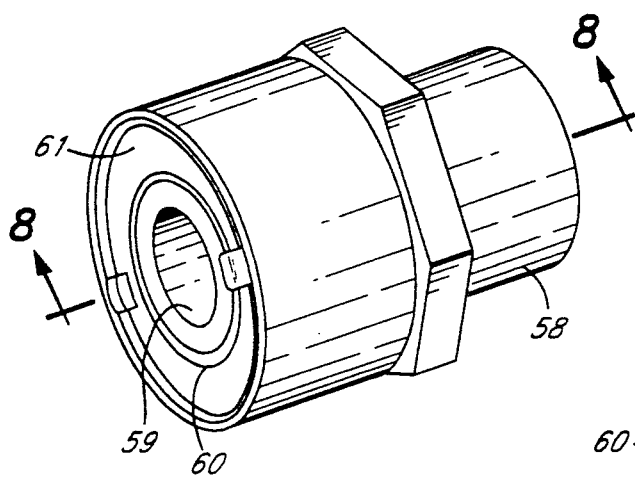
FIG. 7 is a perspective view of a unmodified pool fitting.
Figure 8:
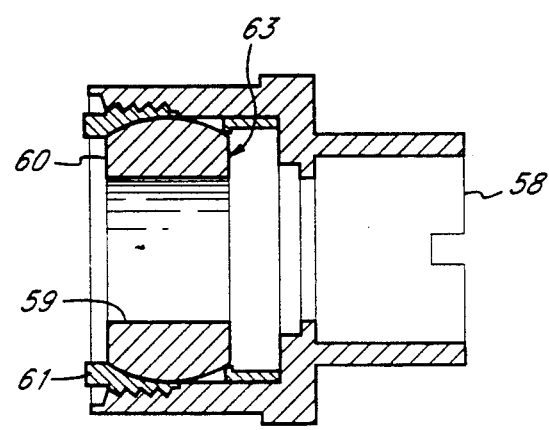
FIG. 8 is a cross-sectional view taken along line 8—8 of FIG. 7.

As illustrated in FIGS. 7 and 8, the fitting 58 conventionally includes an eyeball-shaped directional discharger 60 having a central aperture 59. The directional discharger 60 has a spherical shape with two symmetric sides truncating the spherical shape along vertical planes. As best seen in FIG. 8, a correspondingly shaped retainer ring 61 secures the directional discharger 60 within a socket 63 of the fitting 58 and thereby permits rotation of the discharger 60 in the fitting socket 63.

Figure 9:
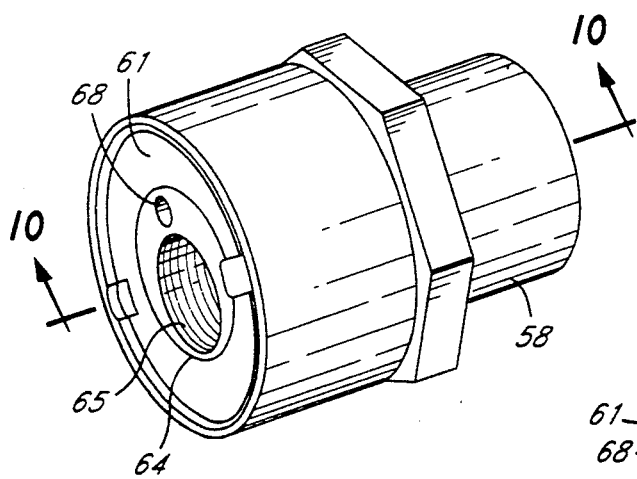
FIG. 9 is a perspective view of the pool fitting of FIG. 7, with a directional nozzle configured in accordance with the present invention inserted into the fitting.
Figure 10:
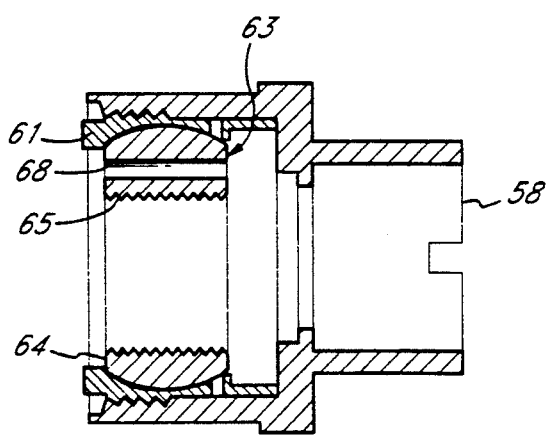
FIG. 10 is a cross-sectional view taken along line 10—10 of FIG. 9.

Referring to FIGS. 9 and 10, the attaching apparatus 16 comprises a similarly shaped directional discharger 64 having a thread hole 65 offset from the center of the directional discharger 64 and a wire passageway 68. The existing retainer ring 61 retains the modified directional discharger 64 within the existing socket 62, as illustrated in FIG. 10.

Figure 11:
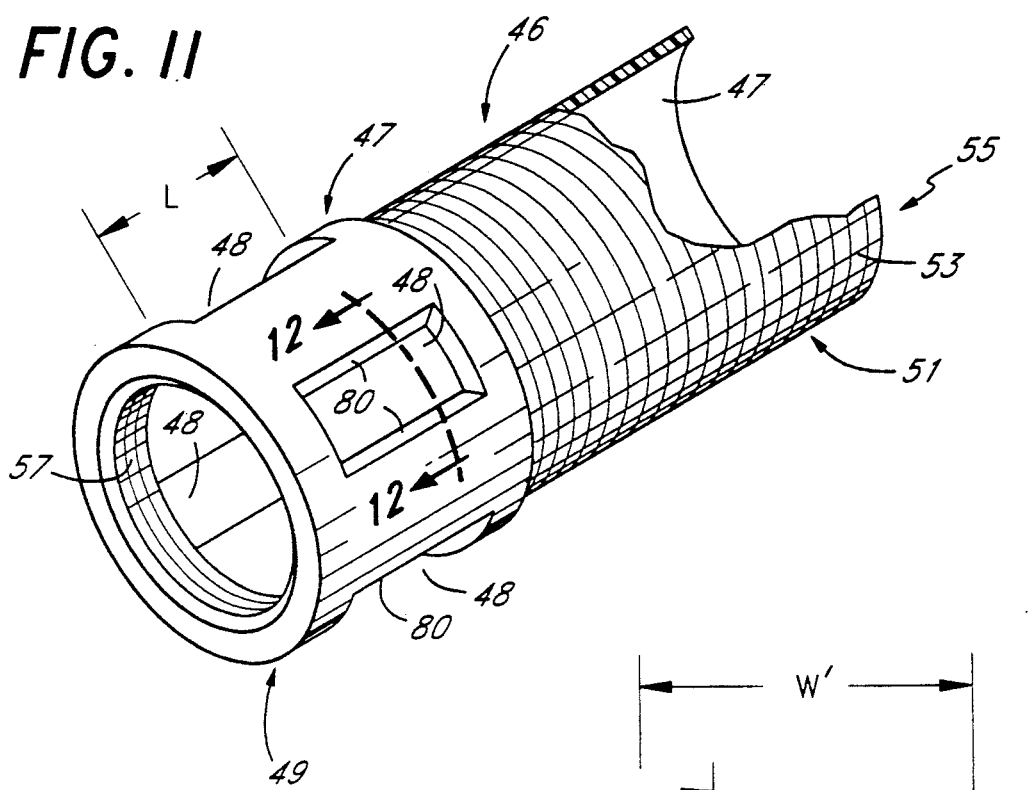
FIG. 11 is a perspective view of a nipple of FIG. 2.

As seen in FIGS. 2 and 6, the attaching apparatus 16 additionally comprises a nipple or nozzle 46. FIG. 11 illustrates the nipple 46 having a generally tubular shape body 45 with an internal flow passage 47. The nipple body 45 defines a plurality of equally spaced apertures 48 proximate to a cap end 49. Although FIG. 11 illustrates the nipple body 45 as defining four apertures, it is understood that any number of apertures 48 can be used as well. Proximate to the apertures 48, the nipple 46 includes internal threads 57 extending into the flow passage 47 from the cap end 49. The nipple 46 also includes a connector 51 having a threaded exterior 53 extending from an engagement end 55 which engages the threaded hole 65 of the directional discharger 64 in assembly.

Figure 12:
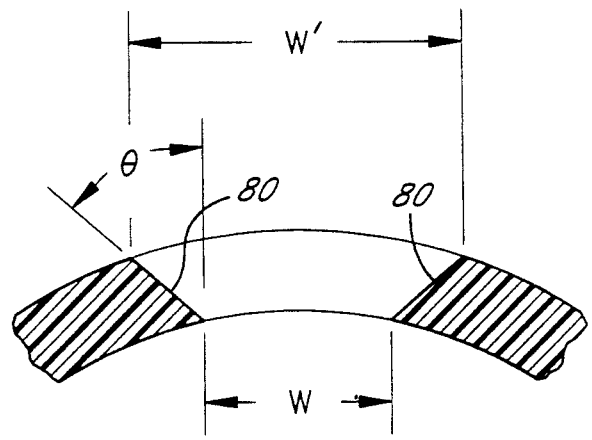
FIG. 12 is a partial cross-sectional view taken along line 12—12 of FIG. 11.

To prevent scale accumulation in the nipple apertures 48, the apertures 48 have a configuration increasing in area in the radial direction perpendicular to the water flow. As illustrated in FIG. 12, chamfered edges 80 define the apertures 48; the edges 80 angle outwardly from a radius of the tubular nipple 46 by an incline angle $\theta$. Preferably, the incline angle $\theta$ ranges between 30$\sqrt{}$ and 60°, and more preferably equals about 45°. As discussed above in connection with the enclosure openings 38, 39, this configuration increases flow rate through the apertures 48. The resulting water jet fractures scale formations extending from the chamfered edges 80.

Although FIG. 11 illustrates the apertures 48 as having a rectangular configuration, it is understood that other aperture configurations, such as, for example, oval or circular shapes, can be used as well. The particular aperture configuration must be sized to produce a sufficient flow rate to break off scale formation accumulating on the edges 80 of the apertures 48. The aperture size, however, should not be too small, as scale and other objects will easy clog the apertures 48.

For example, the rectangular apertures 48 illustrated in FIGS. 11 and 12 have lengths L in the longitudinal direction, widths W at the interior surface of the nipple body, and widths W' at the exterior surface of the nipple body. These dimensions are measured perpendicular to the water flow through the apertures 48. Preferably, the widths W of the apertures 48 ranges between about 1/16th inch and ⅛th inch, and more preferably equals about 3/16th inch for water flowing into the nipple 46 under 2-3 pounds per square inch of pressure.

Figure 13:
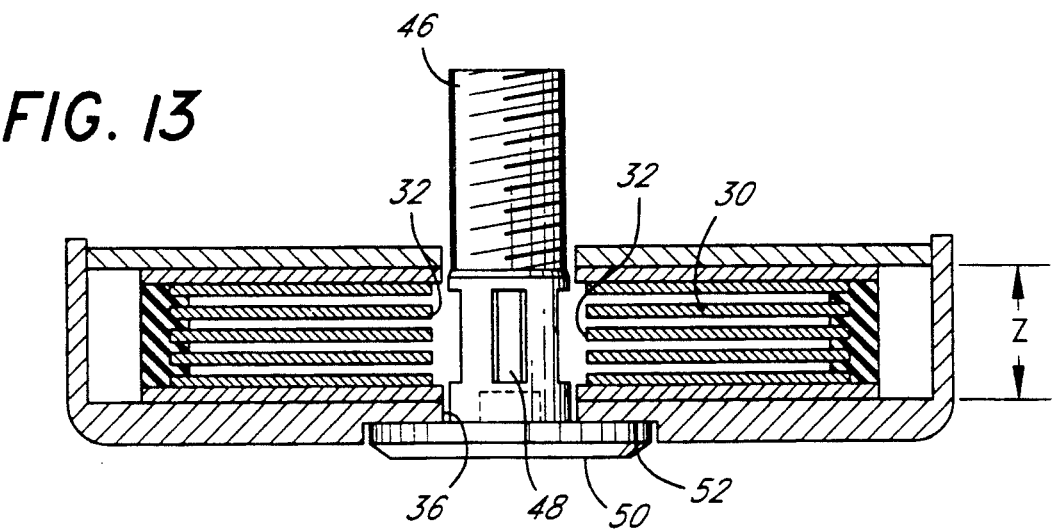
FIG. 13 is a cross-sectional view taken along line 13—13 of FIG. 4.

As illustrated in FIGS. 11 and 13, the longitudinal length L of the aperture chamfer edges 80 is equal to about the stacked width Z of the juxtaposed electrodes 20. As a result, water exiting the apertures 48 flows over the electrode surfaces.

Referring to FIGS. 2 and 6, the attaching apparatus 16 further includes a cap 82 comprising a flange disk 50 and a threaded shank 84 (FIG. 2). The threaded shank 84 is sized to engage the internal threads 57 of the nipple 46, without interfering with water flow through the nipple apertures 48. Although the FIGS. 2, 6 and 11 illustrate the cap 82 as including the externally threaded shank 84, it is contemplated that the cap could include internal threads, and the nipple cap end 49 could include external threads. Additionally, other type of connections, such as, for example, a male-female snap-type connector, can be used as well to removably connect together the cap 82 and cap end 49 of the nipple 46.

The flange disk 50 has a shape commensurate with that of the enclosure recess 26 and is larger in diameter than the enclosure aperture 36. In assembly, the flange disk 50 fits flush with the front panel 24 of the enclosure 34. The flange disk 50 defines two or more cavities 54 that mate with an installation tool. The tool is used to tighten the cap 82 onto the nipple 46, and is used in turn to tighten the nipple 46 into the directional discharger 64.

The attaching apparatus 16, especially the nipple 46, is preferably formed of a generally inert plastic, such as, for example, Teflon ® or a high molecular weight polyethylene. Scale does not adhere well to these types of plastics.

In assembly, the directional discharger 64 fits within the socket 63 of the existing fitting 58 with the retainer ring 61 securing the discharger 64 in place. The nipple 46 threads into the threaded discharger hole 65 and cantilevers away from the pool wall 12. Electrical wires 62 (FIG. 6), connected to the electrolytic cell 30, are threaded through the wire passageway 68. The enclosure 34 secures to the pool wall 12 by sliding over the nipple 46; the enclosure aperture 36 and electrode bore 32 receive the nipple 46. The cap 82 secures the enclosure 34 and electrolytic cell 30 in place by threading into the end cap 49 of the nipple 46. As assembled, the enclosure 34 abuts against the pool wall 12; however, if the pool wall is curved, edge spacers 44 are placed against the flange brackets 42 prior to tightening. The edge spacers 44 can be trimmed or contoured to the pool wall 12 configuration.

Assembled with the fitting socket 63, the nipple communicates with the water circulation line 18. Pressurized water flows inside the tubular nipple 46 and disperses through the apertures 46. As mentioned above, water exiting the apertures 46 flows over each electrode surface 20 and exits through the outlet openings 38, 39.

Figure 14:
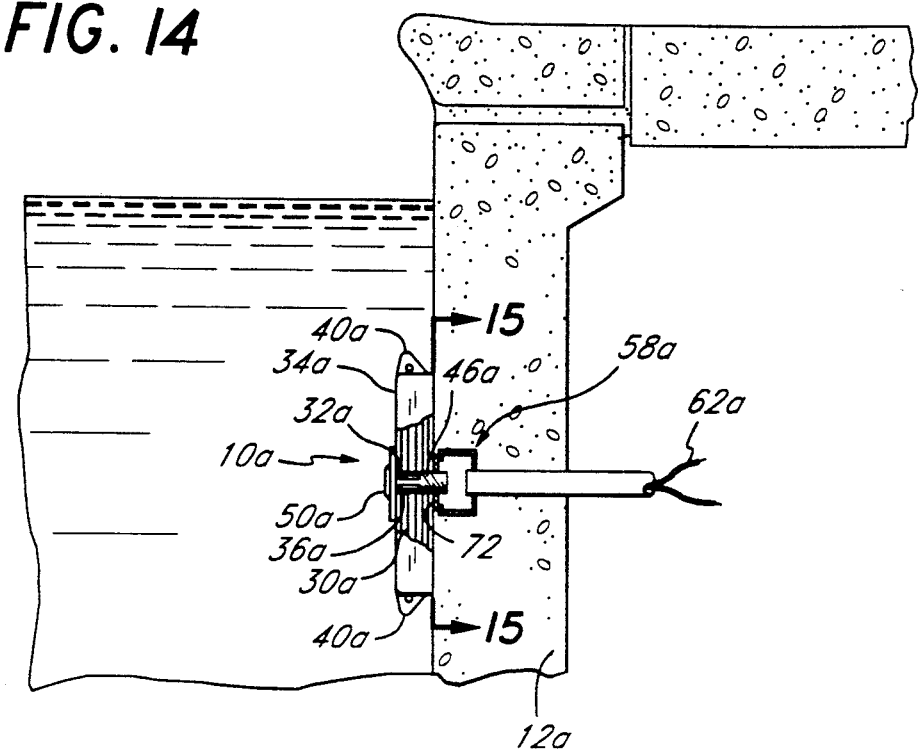
FIG. 14 is a cross section of a pool illustrating a purifier in accordance with a second embodiment of the present invention attachment to a discharge wall fitting.
Figure 15:
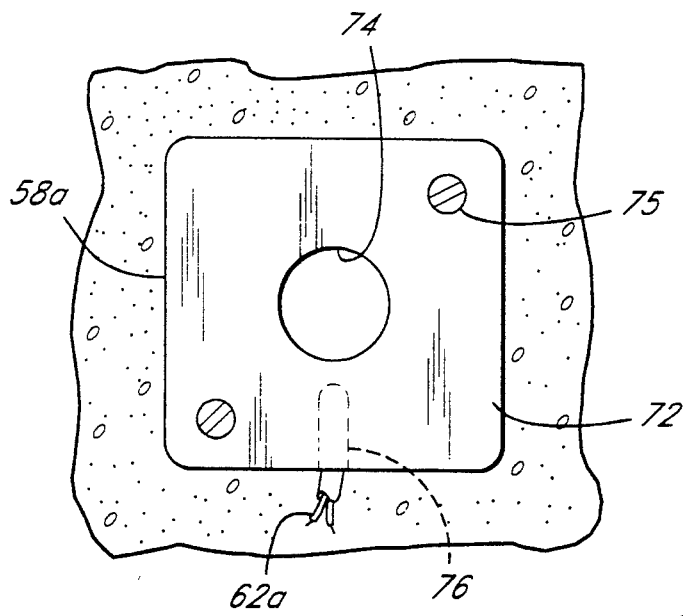
FIG. 15 is a cross-sectional view taken along lines 15—15 of FIG. 14, illustrating an attaching plate in accordance with the purifier of FIG. 14 attached to the wall fitting.
Figure 16:
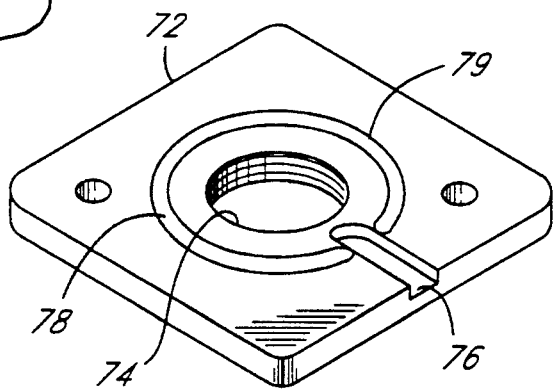
FIG. 16 is a rear perspective view of the wall plate shown removed from, the purifier for clarity.

FIGS. 14 through 16 illustrate an other embodiment of the attaching apparatus 16 for use with another type of pool fitting 58. Where appropriate, like numbers with an "a" suffix are used to indicate like parts of the two embodiments for ease of understanding. Instead of a directional type fitting 58, as previously described, the fitting, as shown in FIG. 14, comprises a wall fitting 58a surrounding an end of the water circulation line 18. If the wall fitting 58a contains a grill or diffuser, it is removed and not used. As depicted in FIGS. 14 and 15, a plate 72 attaches over the fitting 58a in place of a grill.

Referring to FIG. 15, the plate 72 is constructed of thermoplastic and defines a threaded centrally located hole 74 and an offset wire receiving slot 76 near the hole. An O-ring 78, as seen in FIG. 16, fits into a groove 79 and partially encircles the hole 74, terminating at the slot 76. As shown in FIG. 15, the slot 76 permits the wires 62 to extend from the wall fitting 70 towards the purifier 10.

The installation of the purifier 10 is identical to the procedure described above, except that fasteners 75 (FIG. 15), such as, for example, screws, securely fasten the plate 74 to the pool wall 12. The nipple 46 is threaded into the hole 74 and the enclosure abuts against the plate, compressing the O-ring 78 between the plate 74 and the pool wall 12.

The plate 74 can also be used where the circulation line 18 extends to the surface of the pool wall 12. That is, the pool does not include the wall fitting 58a. The plate mounts directly to the pool wall, aligning with and covering over the end of the water circulation line 18. The attaching apparatus 16 and enclosure attach to the plate 74, as described above.

The purifier 10, as defined, provides superior descaling characteristics. In hard water, scale deposits on the edges 80 of the nipple apertures 48 and on the edges 28 of the enclosure openings 38, 39. The diverging orifice configuration of the apertures 48 and the openings 38, 39 produces an increased flow rate through these orifices, as discussed in detail above. The increase flow rate prevents massive scale growth across the openings 38, 39 and the apertures 48. The purifier 10 additionally exhibits greater descaling qualities if used with a power supply reversing the polarity of electricity supplied to the electrodes 20, as described in U.S. Pat. No. 4,992,156. These descaling features extends the life of the purifier 10.

The purifier 10 is also easily retrofitted to a pool 14 by using the existing circulation line fitting 58. The installation, as described above, is simple and cost efficient. Through a few simple installation steps, the nipple 46 couples with the circulation line 18 and extends outwardly from the pool wall 12. The enclosure 34 slips over the nipple 46 and the cap 82 secures the enclosure 34 onto the nipple 46. Installation does not require aligning the enclosure aperture 36 with the threaded hole 65 of the directional discharger 64. Nor does the installation of the purifier 10 require simultaneously coupling the enclosure 34 and the nipple 46 with the directional discharger 64. Thus, installation is usually completed from the pool deck reaching into the pool 14.

In assembly, the enclosure 34 fits flat against the pool wall 12 or smoothly blends with the contoured pool wall 12. This unobtrusive position prevents interference with pool sweeping equipment. The low profile of the purifier 10 as installed also reduces the possibility of interfering with swimmers and is generally inconspicuous—particularly with no wires 62 visible from the outside.

Figure 17:
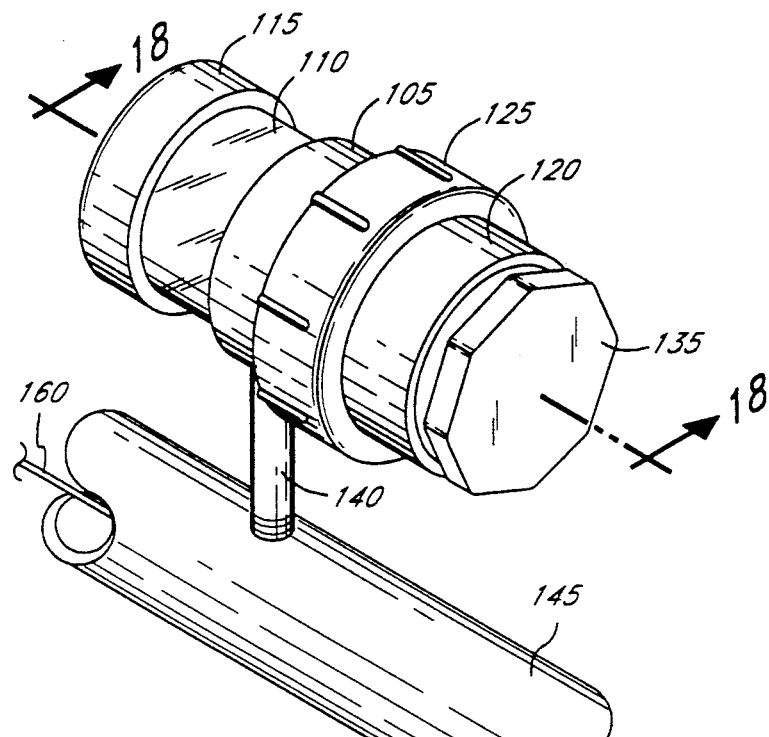
FIG. 17 illustrates a reel in accordance with one embodiment of the present invention fitted into a water circulation pipe.
Figure 18:
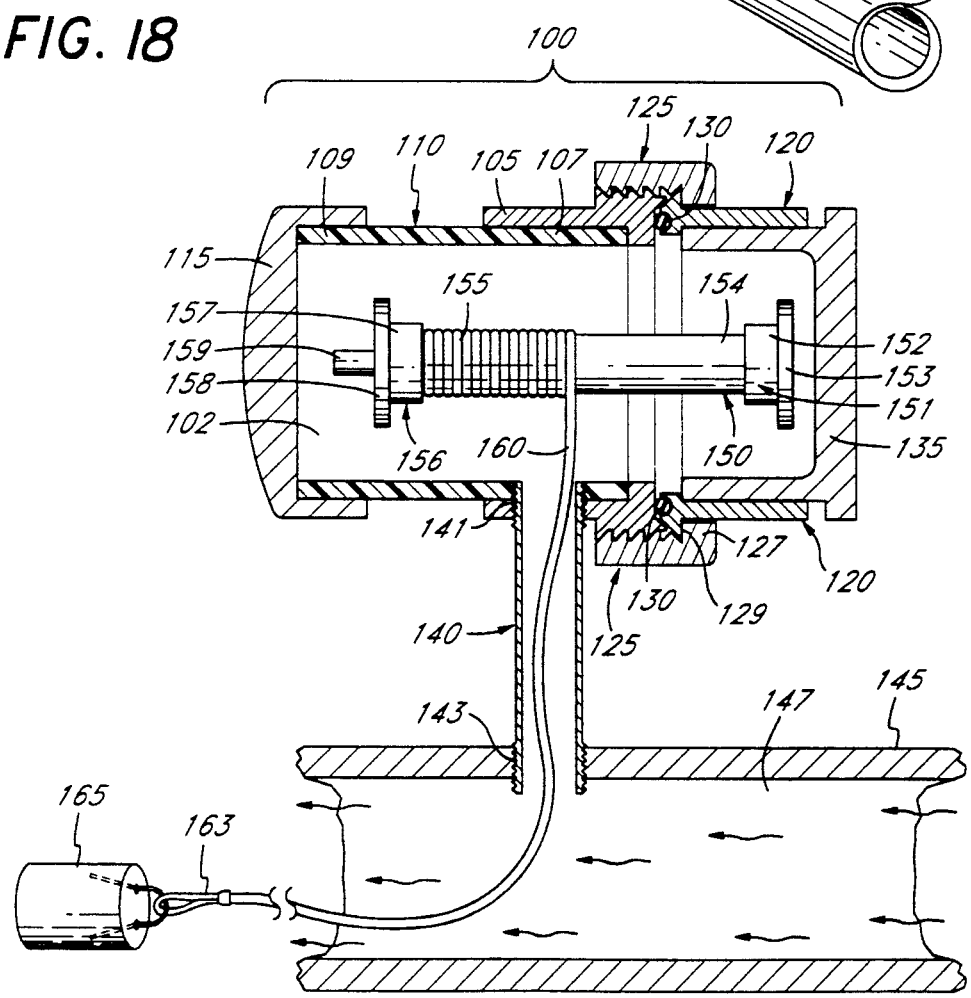
FIG. 18 is a cross-sectional view taken along line 18—18 of FIG. 17.

FIGS. 17 and 18 illustrate a spooling reel in accordance with a preferred embodiment of the present invention. The spooling reel is used to install electrical wire through the water circulation line 18, which typically has a diameter of about two inches, although the portions of the water circulation line 18 below ground level may be about one inch in diameter. The reel comprises a central housing 100 which connects to an above ground section 145 of the water circulation return line 18 via a tubular junction 140. Preferably, the water circulation line section 145 is located near the electrical power supply panel which powers the pool pump. The spooling reel additionally comprises a buoyant spool 150 housed within the central housing 100. When the central housing 100 is filled with water, the buoyant spool 150 floats within an internal chamber 102 defined by the central housing 100. The individual components of the spooling reel will now be described in detail.

In this embodiment, a female union member 105 defines a cylindrical inner surface which fits over an end 107 of a piece of tubing 110. The outer surface of tubing end 107 is fixed to the inner surface of female union member 105 with a water-insoluble adhesive so as to form a watertight seal. At least a portion of the tubing 110 is preferably transparent to allow the operator of the reel to observe the interior of central housing 100. A cap 115 fits over an end 109 of the tubing 110 and is fixed to it by means of a water-insoluble adhesive to form a watertight seal.

The other side of the female union member 105 is removably joined to a male union member 120 by means of a retainer ring 125. A lip 127 on the retainer ring 125 engages a circumferential flange 129 on the male union member 120, and grooves on the retainer ring 125 screw onto threads on the male union member 120, thus joining the female union member 105 to the male union member 120. A rubber or rubberized plastic O-ring 130 is fixed to the surface of the male union member 120 which abuts the female union member 105 so that a watertight seal is formed between the male union member 120 and the female union member 105 when the two are secured by the retainer ring 125.

The male union member 120 defines a cylindrical inner surface which fits over the exterior surface of a cylindrical plug 135. The plug 135 is fixed to the male union member 120 with a water-insoluble adhesive so that a watertight seal is formed between the outer surface of the plug 135 and the inner surface of the male union member 120.

The tubular junction 140 is inserted through the female union member 105 and the tubing 110 such that the interior of the tubular junction 140 is in communication with the interior of the central housing 100. This end 141 of the tubular junction 140 is fixed to the female union member 105 and the tubing 110 by means of threads which screw onto grooves provided in the female union member 105 and the tubing 110. A water-insoluble adhesive may also be placed in these grooves to provide a more secure fit and to form a watertight seal. The other end 143 of the tubular junction 140 is provided with threads which are screwed into a threaded opening formed in the water circulation line section 145.

In this embodiment there is provided a buoyant, cylindrical spool 150 which is preferably hollow and filled with a fluid having a lower specific gravity than the water 147 flowing through the water circulation line section 145. The spool 150 may also be solid, however, and made from a material which itself has a specific gravity lower than that of the water 147 in the water circulation line 18. Mounted on one end of the spool is a closure 151 comprising an annular collar 152 which fits over one end of the spool 154 and a circular base 153. The closure 151 fits tightly over the end of the spool 150 so as to seal off the interior of the hollow spool and may be more securely fastened by using a water-insoluble adhesive. Mounted on the other end 155 of the spool 150 is another closure 156 also comprising an annular collar 157 and a base 158 which fit over end 155 of the spool 150. This closure 156 additionally comprises a cylindrical shaft 159 which extends along the longitudinal axis of the spool and projects from the center of the base 158. The distal end of the shaft 159 has lugs thereon to permit the shaft to be engaged by a socket, as discussed more fully below.

The spool 150 is wound with line 160, which is preferably made from ultra-high molecular weight polyethylene fibers such as Spectra line. The line 160 preferably has a coefficient of friction of no more than about 0.068 and less than 5% stretch. The line 160 of the preferred embodiment has a water absorbancy of no more than about 1% by volume and a specific gravity of about 0.97.

The free end 163 of the line is threaded through the junction tube 140 so that it extends into the water circulation line section 145 when the spooling reel is mounted thereon. A leader 165 is attached to the end 163 such that the leader 165 is disposed within the flow path of the water 147 in the water circulation line section 145. The leader should be buoyant, have a surface shape which presents some drag to a pressurized fluid flow, and have a low water absorbancy, less than 5% by volume. The leader 165 is preferably made from a cylindrically shaped piece of closed cell neoprene having a diameter of about ¼ inch and a length of about ¾ of an inch.

In operation, retainer ring 125 is loosened so that the interior of a chamber 102 defined by the interior surfaces of tubing 110, cap 115, female union member 105, male union member 120, and plug 135 is open to the atmosphere and is at atmospheric pressure. The pool pump is then actuated to pressurize the water circulation line so that the chamber 102 fills with water through tubular junction 140. When the chamber 102 is substantially filled with water so as to allow spool 150 to float, retainer ring 125 is re-secured to female union member 105 to seal the chamber 102 from the atmosphere. The chamber 102 is then under the same fluid pressure as the water 147 in the water circulation line section 145.

As the pool pump forces water through the water circulation line 18 towards the pool, the flow of water drags the leader 165 towards the pool, and in the process unwinds the line 160 from the spool 150. Because the spool 150 floats freely within chamber 102 when the chamber 102 is filled with water from water circulation line section 145, the spool 150 is subject to very little mechanical friction as the line 160 unwinds. It does not encounter sources of mechanical friction other than the interior surface of the chamber 102 which it might occasionally brush against. The leader 165 and line 160 are thus carried through the water circulation line 18 by the flow of pressurized water 147 through the water circulation line 18 towards the pool in the direction indicated in FIG. 18.

After the free end 163 of the line 160 has reached the pool, the pool pump is turned off and the electrical wires 62 are attached thereto. The line 160 is then rewound onto the spool, thereby dragging the wires 62 back through the water return line 18 to the line section 145.

In the preferred embodiment, the spool 150 is removed from the chamber 102 to rewind the line 160 back onto the spool 150. An adaptor such as a socket is inserted onto the lugs at the end of the shaft 159 after the spool 150 has been removed from the chamber 102. A winding mechanism such as a variable speed drill is inserted onto the socket to drive the adaptor to rotate the spool shaft. The winding mechanism thus rotates the spool so as to rewind the line 160 back onto the spool 150.

To complete the instruction, the spooling reel is removed by unscrewing the tubular junction 140 from the water circulation line section 145. The wires 62 are placed through a plug assembly 170 (FIG. 1) comprising a compression fitting and a threaded nipple having a rubber grommet therein. The grommet has a central bore through which the wires extend. The threaded nipple of the plug assembly 170 is threaded into the opening in the line section 145 to seal the line section 145. The compression fitting, which comprises a threaded cap having a central bore through which the wires extend, is then threaded onto the nipple to retain the grommet in the nipple and to compress the grommet so that the bore of the grommet is sealed against the wires. The wires 62 are connected to an AC power supply having a DC output to power the purifier 10.

Although this invention is described in terms of certain preferred embodiments, other embodiments that are apparent to those of ordinary skill in the art are also within the scope of this invention. Accordingly, the scope of the invention is intended to be defined only by the claims which follow.

I claim:

1. A reel for installing a line through a fluid conduit containing a pressurized fluid flow, comprising:
    a housing defining an internal chamber;
    a spool housed with said internal chamber, wherein said spool is buoyant;
    a line wound around said spool; and
    a junction connected to said housing and configured to join said housing to the conduit so that said internal chamber communicates with the conduit.

2. The reel of claim 1, wherein said housing comprises a first union member and a second union member, said first and second union members being removably connected so as to form a substantially water tight union when connected and to expose said spool when disconnected.

3. The reel of claim 1, wherein said buoyant spool comprises a cylindrical body having an internal cavity filled with a fluid having a specific gravity less than that of the fluid flowing through said conduit which causes said spool to float in said internal chamber of said central housing filled with the fluid flowing through said conduit.

4. The reel of claim 1, wherein said internal chamber defines a longitudinal axis and is generally parallel to a water surface of a pool to which said water circulation line connects.

5. The reel of claim 1, wherein said line is buoyant, has a stretch of less than 5% and a coefficient of friction less than 0.1.

6. The reel of claim 1, additionally comprising a leader attached to an end of said line, said leader sized to be carried through said conduit by said pressurized fluid flow.

7. A reel for installing electrical wiring through a water circulation line of a swimming pool, comprising:
    a central housing defining a cylindrical internal chamber, said housing comprising a body and cap removably joined together to form a water-tight union;
    a tubular junction configured to couple said chamber with said water circulation line so that said chamber communicates with said water circulation line;
    an elongate, cylindrical spool housed within said chamber, said spool defining an internal cavity filled with a fluid which has a specific gravity less than that of the water flowing through said water circulation line so that said spool floats within said chamber when said chamber is filled with water from said water circulation line;
    a line wound around said spool which is sized to pass through said tubular junction and into said water circulation line; and
    a leader attached to one end of said line, said leader sized to pass through said water circulation line and to be carried along by the flow of water through said water circulation line.

8. The reel of claim 7, wherein the line is buoyant, has a stretch of less than 5%, and has a coefficient of friction less than 0.1.

9. The reel of claim 8, wherein said line is selected from a group consisting of Kevlar and high molecular weight polyethylene.

10. The reel of claim 7, wherein said leader comprises a buoyant material having an absorbency of less than 5% by volume.

11. The reel of claim 10, wherein said leader has a cylindrical shape with a diameter equal to about 0.25 inch.

12. The reel of claim 11, wherein said leader comprises a closed cell neoprene material.

13. The reel of claim 7, wherein a longitudinal axis of said central housing is generally parallel to a water surface of a pool to which said water circulation line connects.

14. The reel of claim 7, wherein a longitudinal axis of said central housing is generally perpendicular to a longitudinal axis of said tubular junction.

15. A method for installing an electrical wire through a conduit containing a pressurized fluid flow, said method comprising the steps of:
    providing a spool wound with a length of line having a leader attached at a free end of said line;
    positioning said spool within an enclosed chamber;
    floating said spool within said chamber;
    coupling said chamber with said conduit so that said chamber communicates with said conduit;
    pressurizing said chamber such that the pressure within said chamber is at least substantially equal to the pressure within said conduit;
    positioning said leader within said conduit;
    causing the flow of a fluid through said conduit to carry said leader said leader and said line being pulled through a portion of said conduit and out of said conduit downstream of said chamber; and feeding said line into said conduit.

16. The method of claim 15 additionally comprising the step of positioning a longitudinal axis of said spool within a plane generally parallel to the water surface of the pool.

17. The method of claim 15, wherein said step of pressurizing said chamber comprises the steps of:
 causing the flow of a fluid from said conduit into said chamber; and
 filling said chamber at least partially with said fluid to produce a pressure within said chamber substantially equal to the pressure at an adjacent point in said conduit.

18. The method of claim 15, wherein said step of coupling said chamber with said conduit comprising the steps of:

inserting a tubular junction into a hole in said conduit, thereby forming a watertight joint between said junction and said conduit with an internal passageway of the tubular junction communicating with an internal passageway of said conduit; and
 attaching said tubular junction to a central housing defining said chamber with said internal flow passageway of said conduit communicating with said chamber via said internal passageway of said tubular junction.

19. The method of claim 15, additionally comprising the steps of:
 attaching said line to wiring once the line has exited the conduit downstream of the hole drilled into said conduit: and
 pulling said line and wiring back through said conduit in order to install the wire.

* * * * *